July 21, 1959
J. B. POHLENZ
2,895,809
LIQUID-FLUID CONTACTOR
Filed March 12, 1956
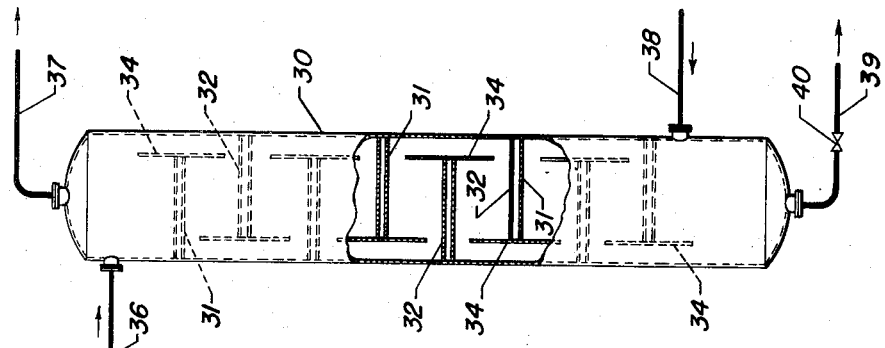
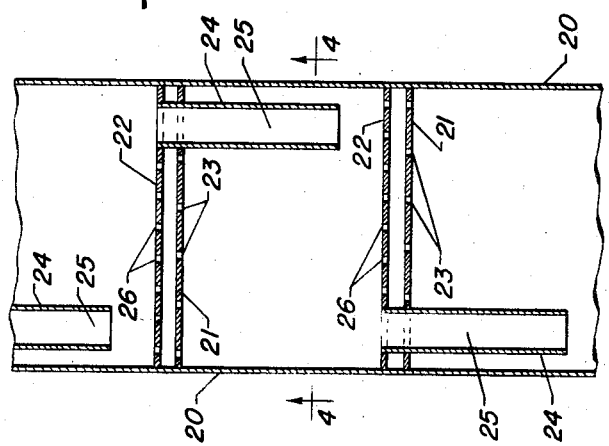
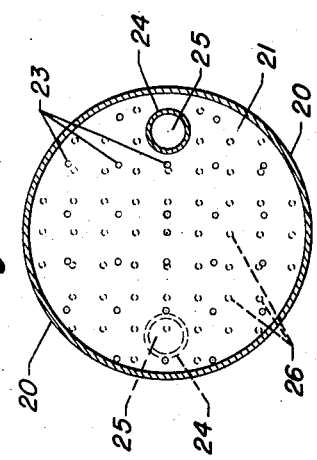
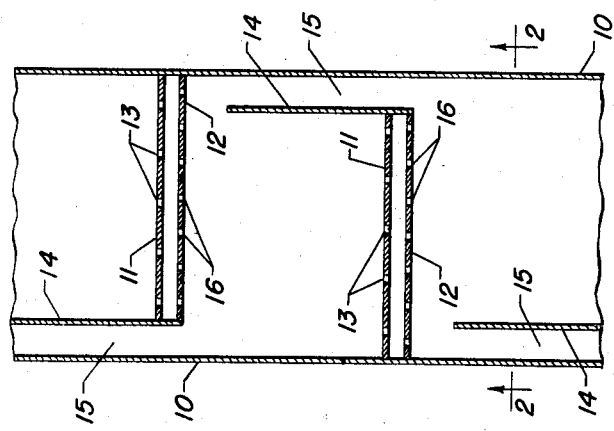
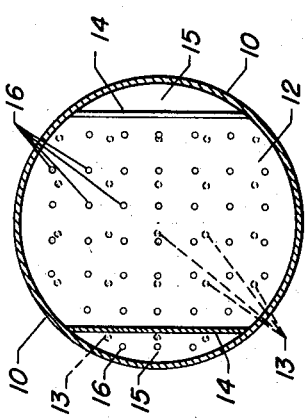
INVENTOR:
Jack B. Pohlenz
BY:
Chester J. Giuliani
Glen R. Grunewald
ATTORNEYS.

United States Patent Office 2,895,809
Patented July 21, 1959

2,895,809

LIQUID-FLUID CONTACTOR

Jack B. Pohlenz, Riverside, Ill., assignor, by mesne assignments, to Universal Oil Products Company, Des Plaines, Ill., a corporation of Delaware Application March 12, 1956, Serial No. 571,012

3 Claims. (Cl. 23—270.5)

This invention relates to a liquid-fluid contacting column and in particular to a unique sieve deck design which is especially useful in multi-stage liquid-fluid contactors.

Liquid-fluid contacts of two general classes are frequently desirable. These general classes are contacting a liquid with another liquid which is at least partially immiscible therewith and contacting a liquid with a gas. This invention broadly relates to both types but finds particular utility in contacting liquids with other immiscible liquids and the discussion of this invention will be largely limited thereto. It is to be understood that describing this invention in relation to liquid-liquid contacts is not intended to remove liquid-gas contacts from its broad scope.

Frequently in liquid-liquid contacts a stable or semi-stable dispersion of one liquid phase in the other occurs. When the dispersion occurs, the operability of a multi-stage contactor is impaired unless the dispersion settles in a shorter time than it takes for the various fluids to pass between zones. Therefore, in a multi-stage liquid-liquid contactor, when a dispersion of the continuous phase in the discontinuous phase occurs, the continuous phase becomes entrained in the discontinuous phase with the result that the entrained liquid is physically carried back to the stage from which it came resulting in destruction of countercurrent contact and unnecessary loading of the apparatus. As hereinbefore stated, the criterion in determining whether or not a dispersion will cause difficulty is its settling time in relation to the rate at which it travels through a stage.

When an entrainment problem is encountered in an ordinary sieve deck multi-stage contacting column it is difficult to increase the settling time. It may readily be seen, for example, that raising the liquid level on each tray in a column which is operating with the more dense phase dispersed through the perforations will increase the head of liquid on each tray. Although a greater inventory of liquid is present on each tray, the settling time is not increased a corresponding amount because the increased head causes faster flow through the perforations. Not only does the increased level on the tray fail to increase residence time by a corresponding amount, but the higher velocity streams of liquid passing through the perforations are more turbulent than when operating with a lower level and this increased turbulence causes even greater quantities of dispersion to form so that the need for settling time is increased.

As hereinbefore described, this situation occurs in a liquid-liquid contacting column wherein the less dense phase is continuous and the more dense phase is dispersed through the less dense phase. This situation will also occur in columns wherein the less dense phase passes upwardly through the perforations and is dispersed into a continuous more dense phase passing from stage to stage through conduits discharging directly into the more dense phase in the stage below. Similarly, in liquid-gas contacts, either the liquid phase or the gas phase may be dispersed and in either situation the formation of dispersions causes the continuous phase to be recirculated. It is an object of this invention to provide a novel tray assembly which prevents the above described difficulties from occurring.

It is an embodiment of this invention to provide a sieve deck assembly which comprises in combination two horizonal spaced parallel perforated plates having different open areas and conduit means passing from beneath the lowermost of said plates to above the uppermost of said plates and extending beyond the plate having less open area.

It is another embodiment of this invention to provide a multi-stage liquid-fluid contacting column comprising in combination a vertical shell having upper inlet and outlet means, lower inlet and outlet means and a plurality of vertical spaced sieve deck assemblies, each of which is comprised of two horizontal spaced parallel perforated plates having different open areas and conduit means passing from beneath the lowermost of said plates to above the uppermost of said plates and extending beyond the plate having less open area with the vertical relationship of the plate having more open area and the plate having less open area the same in each of said tray assemblies.

Briefly, this invention provides a sieve deck assembly consisting of two plates, one having more open area than the other. The fluid passing through each tray assembly passes through the plate having less open area first and the plate having more open area next so that for any given pressure drop across the entirely assembly, the greater portion of it will be across the first plate through which the fluid passes. When these trays are employed to contact two immiscible liquids which tend to form a dispersion, the head of discontinuous phase on the tray may be increased to provide settling time without creating a significant disturbance in the next tray into which the dispersed phase passes. This is accomplished as follows. In the case where the heavy phase is dispersed, when the level is raised there is an increased head of liquid above the tray which tends to drive the liquid through the tray at a faster rate. The increased rate of flow through the perforations causes increased pressure drop across the tray which would, if it were not for this invention, result in droplets having high kinetic energy discharging into the stage below. In the tray of this invention, however, the major portion of the increased pressure drop is across the first plate, or the plate having less open area. The kinetic energy of the droplets is thereby converted to heat or other energy in the homogeneous liquid between the plates.

The liquid discharging from between the plate, through the plate having more open area, experiences a very small pressure drop, proportionately to the pressure drop across the entire tray, and enters the immiscible phase with little kinetic energy and correspondingly little tendency to form a dispersion. Because of the low velocity of the flow through the perforations, the droplet flow is less turbulent and the average droplet size is larger and both of these conditions tend to reduce dispersion problems. Therefore, the level on a tray may be raised without raising the flow rate by a corresponding amount because the increased pressure drop through two plates consumes a substantial amount of the added head of liquid. On the other hand, the increased pressure is distributed to a very great extent through the first plate so that, even though there is high pressure drop across the assembly, there are low-kinetic energy droplets entering the next successive stage.

The invention can be further described with reference to the accompanying drawings which illustrate in Figures 1 and 2 respectively a sectional elevation and sectional plan view of two complete stages illustrating one type of arrangement of this invention in which the more dense phase is dispersed through a layer of less dense phase. Figures 3 and 4 respectively show a sectional elevation and sectional plan view of two complete stages arranged so that the less dense phase is dispersed into a layer of more dense phase. The apparatus of Figures 3 and 4 employs circular fluid transfer conduits whereas the apparatus of Figures 1 and 2 employs chordal conduits, these being equivalents of each other as well as other types and shapes of other fluid passageways. Figure 5 illustrates schematically an elevation view of a column consisting of numerous stages of contact and illustrates their relationship to each other. In Figure 5 a special type of fluid transfer passageway is employed which extends both above and below the tray assembly so that the upper portion of each conduit is at a higher elevation than the lower opening of the next higher conduit. As will be hereinafter explained, this means of disposing conduits provides for level control on each tray and may be operated with either phase dispersed.

Referring to Figures 1 and 2 in which corresponding parts have the same numbers, there is illustrated a contacting zone contained within circular shell 10 and set off on the top and bottom by identical tray assemblies. Each tray assembly consists of two parallel plates, 11 and 12 spaced apart so that a layer of fluid is between them. Each tray assembly also has a vertical partition 14 which extends from below each tray assembly to a point somewhat above each tray assembly and connects to cylindrical shell 10 to form a fluid passageway 15. As hereinbefore stated, the embodiment of this invention shown in Figures 1 and 2 is adapted so that a layer of more dense phase accumulates above each tray assembly and passes through tray 11 containing perforations 13 into the space between trays. Plate 11 either contains fewer perforations 13 than tray 12 contains perforations 16 as shown herein or tray 11 will contain smaller perforations. In any event, the percent open area through plate 11 is less than the open area through plate 12 so that more pressure drop is required to pass liquid through plate 11 than through plate 12.

The less dense material passes upwardly through the column in countercurrent stagewise contact with the more dense material and passes as a continuous stream into each stage above the layer of more dense material and then across the stage into the passageway 15 and into the next higher stage, being contacted while passing laterally across each stage by subdivided droplets of more dense phase raining down therethrough.

In ordinary operation of the embodiment of Figures 1 and 2, if sufficient settling time is available on each tray, there will be a layer of clear more dense liquid immediately above tray 11 so that the streams passing into the space between trays 11 and 12 will not contain substantial quantities of entrained less dense material. If, however, a dispersion of less dense material in more dense material occurs to such an extent that less dense material is carried through plates 11 and 12 and returned to the next subjacent stage, the level in each stage, or the elevation of the interface between less dense and more dense phase, may be raised. In raising this interface, a greater head of liquid will be on each tray and an increase in flow rate through the perforations will result. Since the pressure drop due to increased flow rate is increased mostly through the first plate of the assembly, any high velocity, high kinetic energy droplets resulting from the increased pressure drop will be discharged into the clear more dense liquid between plates. Therefore, the head will be converted to other energy forms without forming dispersion and the clear liquid discharging from between the plates into the less dense liquid in the stage below will be in the form of relatively large, low velocity and low kinetic energy droplets since the pressure drop through perforations 16 in plate 12 will be relatively low.

As hereinbefore stated, Figures 3 and 4 illustrate an embodiment of this invention wherein the less dense phase is dispersed and the more dense phase is continuous. The embodiment of Figure 3 further illustrates the use of circular or cylindrical internal conduits instead of the chordal conduits employed in the previous figures. In the embodiment of Figures 3 and 4 the less dense phase accumulates below each tray assembly and passes through perforations 23 in plate 21 into the space between plates 21 and 22. The more dense liquid passes above each tray assembly and has droplets of the less dense liquid rising therethrough, with the more dense liquid passing laterally across each tray and downward through conduit 24 into the layer of more dense liquid maintained on the tray below. In the embodiment wherein the less dense phase is dispersed, it is necessary that the uppermost of the two parallel plates have greater open area so that a greater number of perforations 26 are in plate 22 than there are perforations 23 in plate 21.

Figure 5 illustrates a column comprising eight tray assemblies. The column consists of a vertical cylindrical shell 30 having upper inlet 36 for more dense phase and upper outlet 37 for less dense phase and in the lower portion and inlet 38 for less dense phase and an outlet 39 for more dense phase. Although only these are shown, more or less inlets and outlets may be employed and these may be in an intermediate portion for introducing additional feed streams or reflux streams as well as for removing side cut streams.

The embodiment of Figure 5 illustrates the use of overlapping fluid transfer conduits for passing the continuous phase between stages. In the column of Figure 5, it is not practical to increase settling time by raising the level since the level on each tray is established by the position of the upper or lower opening to fluid passageway 35, however, this invention is useful in preventing the formation of too much dispersion of one phase in another while operating at high throughputs. In this column, plates 31 and 32 will be arranged so that the first plate through which the dispersed phase flows will have the least open area. The column may be operated with either phase dispersed as hereinbefore stated and the operation in one manner or another is regulated by the method of controlling fluid flow rate. By way of example only, when it is desired to operate with the more dense phase dispersed, a valve 40 disposed in line 39 will be employed to regulate the inventory of more dense material in the column. By drawing off more dense phase from the lowermost chamber in the column in response to variations in the level in the uppermost chamber, the more dense phase is caused to be dispersed through the less dense phase and the interface on each stage is maintained at the lower opening of the conduit leading to the next higher stage. By drawing off more dense phase from the lowermost chamber responsive to the interface level in the lowermost chamber, the column can be made to function with the more dense phase continuous, the less dense phase dispersed and the interface maintained at the upper opening to each interstage transfer conduit.

The tray assembly of this invention may be modified to adapt it for special functions without removing it from the broad scope of this invention. The number or shape of the transfer conduits between stages may be varied. When large diameter columns are employed many transfer conduits may be employed to prevent too great a hydraulic gradient across a tray. The perforations may be modified to the form of slots, lined holes or holes having special internal configuration. In liquid-gas contacts wherein the gas phase is dispersed, the uppermost plate of each tray may contain bubble caps. Packing material such as pebbles, saddles, rings, glass beads, metal mesh, etc., may be employed in each stage to effect better contact. Furthermore, the upper and lower plates of each assembly may be made from different material. For example, if the lower plate is preferentially wetted by the less dense phase and the upper plate is preferentially wetted by the more dense phase or vice versa settling of dispersions and formation of distinct droplets may be aided.

I claim as my invention:

1. A multi-stage liquid-fluid contacting column comprising a vertical shell having upper fluid inlet and outlet means and lower fluid inlet and outlet means, a plurality of vertically spaced sieve deck assemblies in the shell, each of said deck assemblies comprising a pair of vertically spaced, horizontal plates, each of said plates having a plurality of horizontally spaced perforations and one of said plates having a greater perforated area than the other, and conduit means extending vertically and in one direction only from the plate having the greater perforated area through and beyond the plate having the smaller perforated area, the conduit means of each deck assembly terminating within the space between the last-named deck assembly and the next adjacent deck assembly.

2. A multi-stage liquid-fluid contacting column comprising a vertical shell having upper fluid inlet and outlet means and lower fluid inlet and outlet means, a plurality of vertically spaced sieve deck assemblies in the shell, each of said deck assemblies comprising a pair of vertically spaced, horizontal plates, each of said plates having a plurality of horizontally spaced perforations and the lower plate having a greater perforated area than the upper plate, and conduit means extending upwardly and in one direction only from the lower plate through and beyond the upper plate, the conduit means of each deck assembly terminating short of the lower plate of the next higher deck assembly.

3. A multi-stage liquid-fluid contacting column comprising a vertical shell having upper fluid inlet and outlet means and lower fluid inlet and outlet means, a plurality of vertically spaced sieve deck assemblies in the shell, each of said deck assemblies comprising a pair of vertically spaced, horizontal plates, each of said plates having a plurality of horizontally spaced perforations and the upper plate having a greater perforated area than the lower plate, and conduit means extending downwardly and in one direction only from the upper plate through and beyond the lower plate, the conduit means of each deck assembly terminating short of the upper plate of the next lower deck assembly.

References Cited in the file of this patent
UNITED STATES PATENTS

| | | |
|---|---|---|
| 2,271,462 | Pfennig | Jan. 27, 1942 |
| 2,528,426 | Davis et al. | Oct. 31, 1950 |
| 2,678,199 | Koch | May 11, 1954 |
| 2,717,854 | Felix | Sept. 13, 1955 |